W. S. HADAWAY, Jr.
METER.
APPLICATION FILED DEC. 26, 1912.
1,265,775.
Patented May 14, 1918.
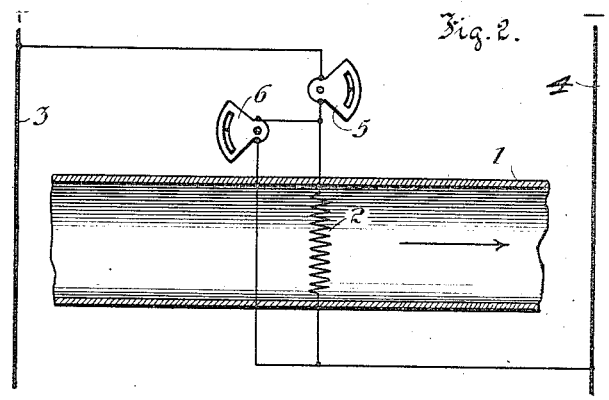
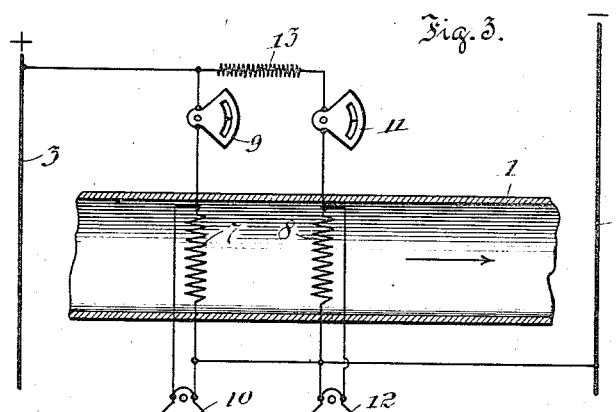
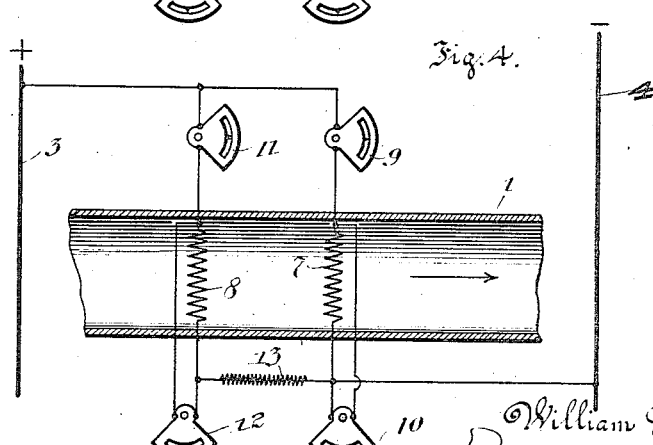

UNITED STATES PATENT OFFICE.

WILLIAM S. HADAWAY, JR., OF NEW ROCHELLE, NEW YORK.

METER.

1,265,775.   Specification of Letters Patent.   Patented May 14, 1918.

Application filed December 26, 1912. Serial No. 738,644.

*To all whom it may concern:*

Be it known that I, WILLIAM S. HADAWAY, Jr., a citizen of the United States, residing at New Rochelle, in the county of Westchester and State of New York, have invented new and useful Improvements in Meters, of which the following is a full, clear, concise, and exact description, reference being had to the accompanying drawing, forming a part of this specification.

My invention relates to improvements in meters.

One of the objects of my invention is to provide means for accurately determining the rate of activity of a heated surface, or, as it may otherwise be expressed, for determining the work performed by a surface which is giving up heat. Another object is to provide improved means for determining the heat conductivity of solids, liquids or gases. A further object is to provide improved means for measuring the flow of liquids or gases.

Other objects and advantages of the invention will hereinafter appear.

Figure 1 of the drawings is a diagram to which reference is to be made for an understanding of the broad underlying features of the invention.

Figs. 2, 3 and 4 illustrate concrete embodiments of one phase of the invention, each figure representing a different embodiment.

In Fig. 1, an active element or heating element is indicated by the letter R, said heating element being preferably an electrical resistance which dissipates heat to the surrounding medium M when current is passed through said resistance. If we assume that the resistance is surrounded by a given gas, the heat dissipated by said element will be conducted away by said gas at a certain rate determined by the characteristics of said gas. If again we assume said resistance to be surrounded by a gas having greater heat conducting properties, heat will be conducted away from the resistance at a higher rate, thereby maintaining said resistance at a lower temperature than in the first case. If the resistance or active element is made of material which changes its resistance with changes in temperature, it will be seen that the difference between the resistance of said element when dissipating heat to one surrounding medium, and when dissipating heat to a different surrounding medium, will be an indication of the heat-conducting properties of said respective media. The variation in the resistance of said element may be readily determined by measuring the current flowing therethrough with an ammeter and by measuring the voltage drop across said element with a voltmeter, and making the necessary calculation.

Similarly, if said resistance element is immersed in a liquid, the resistance of said element may also be used as a basis for determining the relative conductivity of said liquid with respect to other liquids, in a manner analogous to that described above.

As a further illustration, said resistance may be embedded in a solid, and the heat-conducting properties of said solid may be similarly determined, or the rate of activity of any heat radiating surface of said solid may be ascertained.

In all of the above illustrations, the basis for calculation is the relative efficiencies of the various media in taking heat from the heat dissipating element. In all cases, said media have what might be called a "cooling effect" in that they take away heat which, if not removed, would cause a great increase in the temperature of the heating element.

In the case of liquids and gases, it is apparent that the "cooling effect" may be obtained not only by conduction, but also by convection, that is, by relative movement of the surrounding medium with respect to the heating element. Thus, the "cooling effect" or, as it may be termed in this case, the "ventilating effect" of liquid or gas is much increased if said liquid or gas is flowing past the heating element. For a high rate of flow, the temperature of the heating element will not be permitted to rise as much as it would rise for a lower rate of flow. Hence, by arranging the heating element in a conduit whereby the stream of fluid whose flow is to be determined, is forced to flow past said heater, it will be seen that means are provided for determining the weight of the passing fluid regardless of variations in the temperature, pressure or volume thereof.

My invention, therefore, in its broad aspects, has numerous phases. The present application deals more particularly with that phase of the invention wherein the heat is dissipated to a moving fluid body, for example, steam, gas or vapor.

In carrying out my invention along the suggested lines, I arrange an electrical heating unit in a chamber or conduit through which passes the stream of gas or steam whose flow is to be measured, and measure the difference between the temperature of the heater material when substantially no heat is being dissipated and when the gas is being heated at a known or determinable rate. For a given rate of heat dissipation this temperature difference varies with the rate of flow of gas, decreasing as the rate of flow increases and vice versa, or for a given temperature difference the rate of heat dissipation required to maintain said constant difference varies with the changes in the rate of flow and, in either case, is a measure of said rate of flow.

The apparatus illustrated in Fig. 2 consists of a suitable chamber or conduit 1 through which passes the flowing gas in the direction indicated by the arrow. An electrical heating element 2 is arranged within the chamber and is preferably uniformly disposed across the same in the form of a grid or screen. Said element is made of resistance material which varies its resistance with changes in temperature. The form of the heating element may be varied within wide limits, but as the details of said element and the manner of mounting the same form no part of the present invention, said heating element is illustrated only diagrammatically.

Current may be supplied to the electrical heating element from any suitable source, for example, from the mains 3, 4, across which said heating element is connected in the present instances. An ammeter 5 is connected in series with the heating element to measure the current supplied thereto and a voltmeter 6 is connected across the terminals of said heating element to measure the voltage drop across the same.

When the gas is flowing past the heating element and little or no current is flowing through the latter, its temperature will be the same as the temperature of the gas. When, however, considerable current is flowing through said heating element, its temperature tends to increase greatly, and heat is dissipated to said flowing gas which conveys away the heat as it is being generated, thereby preventing the heater from reaching as high a temperature as it otherwise would attain. In other words, the flowing gas has a cooling or ventilating effect on the heating element, the temperature of the heating element being less than it would be if the gas were stationary. This ventilating effect is more pronounced with a high rate of flow and is less for a lower rate of flow. Hence, the increase in the temperature of the heater above its initial temperature is regulated or controlled by the quantity of gas which flows past it, assuming other factors to remain the same. If the rate of heat dissipation is automatically maintained constant, it will be seen that the variations in this difference of temperature will be a measure of the rate of flow. To determine this difference of temperature for any known rate of heat dissipation, it is necessary merely to measure the resistance of the heater when the unheated gas is flowing, only a small amount of current being permitted to flow through the heater for this purpose, and then again to measure the resistance of said heater when sufficient current is flowing therethrough to cause the dissipation of enough heat to effect a substantial rise in temperature of the gas. The resistance of the heater material in both cases is readily obtained by reading the ammeter and voltmeter and referring to suitable calibration curves. Knowing the two different values of the resistance, the rate of flow of the gas may be readily determined by calculations or by referring to suitable calibration curves.

The apparatus shown in Fig. 3 comprises two substantially similar resistance elements 7 and 8, which are also similar to the resistance element shown in Fig. 2. An ammeter 9 and a voltmeter 10 are provided for measuring the resistance of the element 7 and a second ammeter 11 and voltmeter 12 are provided for measuring the resistance of the element 8. A resistance 13 is arranged in series with the heating unit 8 but has no effect on the unit 7. Accordingly, sufficient heat may be dissipated from the heater 7 to cause an appreciable rise in the temperature of the flowing gas, the small amount of current flowing through the resistance 8 having no appreciable heating effect thereon.

By taking suitable readings in the manner previously described, the resistance of the heater unit 7 may be obtained. The resistance of the heater unit 8 may also be obtained in a similar manner. The value of this latter resistance is a measure of the temperature of the gas after heating. For a known rate of heat dissipation, the flowing gas will have its temperature increased an amount dependent on its rate of flow, a high rate of flow resulting in a slight increase in temperature and a low rate of flow resulting in a greater increase in temperature. From the two readings obtained, the rate of flow may be determined by reference to suitable calibration curves.

The apparatus shown in Fig. 4 is substantially the same as that shown in Fig. 3, and the same reference characters have been applied to corresponding parts. In this latter figure, however, the heater 7 is arranged in the rear of the thermometer 8, the resistance 13 being connected in series with said thermometer, whereby only a small amount of current flows through said thermometer, the main heating current flowing through the resistance 7. With this arrangement, the resistance of the thermometer 8 gives a measure of the temperature of the unheated gas as it approaches the heater. A comparison of the resistances of the elements 7 and 8 with suitable calibration curves will, in this case also, permit the rate of flow of said gas to be readily determined.

One important advantage of all of these methods of measurement is that the amount of electrical energy consumed by the apparatus is relatively small. Another advantage is that the number of resistance elements required is small, thereby providing a meter of simple and economical construction.

It is to be understood, of course, that the phase of the invention under discussion is not to be limited to the devices and circuit arrangements illustrated, but may be embodied in various other forms. Furthermore, as appears from the introductory statements, the numerous other phases of the invention may be embodied in widely divergent forms adapted for entirely different applications in the various arts.

What I claim as new and desire to secure by Letters Patent of the United States is:—

1. The method of measuring the flow of fluids which consists in passing a stream of said fluid into heat exchanging relation to a body or medium to cause a heat transfer at a determinable rate and determining the temperature effect on the body or medium of the heat transfer.

2. The method of measuring the flow of fluids which consists in determining the temperature effect of a stream of the flowing fluid on a body or medium to which heat energy is supplied at a determinable rate.

3. The method of measuring the flow of fluids which consists in determining the cooling effect of a stream of the fluid on heat dissipating means subjected thereto and to which heat is supplied at a determinable rate.

4. The method of measuring the flow of fluids which consists in supplying heat at a determinable rate to a heater in a stream of fluid and determining the effect on the heater of the heat transfer between the fluid and the heater.

5. The method of measuring the flow of fluids which consists in imparting heat at a determinable rate to a stream of fluid from a suitable heater and determining the cooling effect of the fluid on the heater.

6. The method of measuring the flow of fluids which includes determining the temperature of the unheated fluid, imparting heat to said fluid at a determinable rate by means of a heater and determining the temperature of the heater while imparting heat to the fluid.

7. The method of measuring the flow of fluids, which includes determining the resistance of an electrical resistance element arranged in the stream of fluid when substantially no current is flowing through said element, imparting heat to said fluid by passing a current through said element and determining the resistance of said element when the heating current is flowing therethrough.

8. The method of measuring the flow of fluids, which includes sending at different times a small current and a large current through a single electrical resistance located in a stream of the fluid, said large current serving to heat said fluid, determining the resistance of said resistance with the different currents flowing therethrough and determining therefrom the temperature of the flowing body of fluid before and after being heated.

9. The method of measuring the flow of fluids which consists in imparting heat at a determinable rate to a stream of fluid by means of a heated body and determining the ventilating effect of the flowing stream on the heated body.

10. The method of measuring the flow of fluids which consists in dissipating heat at a predetermined rate to a flowing stream of the fluid by means of an electrical heating element and determining the cooling effect of the moving body of fluid on said heating element.

11. A meter comprising a housing, a single heating element within the housing for dissipating heat to the fluid flowing therethrough, said element having a resistance which changes with changes in temperature, means for measuring the variations in resistance of said element and means for measuring the energy supply to said element.

12. A fluid meter comprising a housing, a single electrical heating element therein for dissipating heat to the fluid flowing through the heater, said element having a positive temperature coefficient, means for measuring the variations in resistance of said element, and means for measuring the energy supply to said element.

13. A fluid meter comprising a single electrical resistance element arranged in a conduit to dissipate heat to a moving body of fluid flowing through said conduit and means for measuring the resistance of said element when dissipating heat at a negligible rate and when dissipating heat at a predetermined rate whereby the rate of flow of fluid may be determined.

14. A meter comprising a conduit through which passes the fluid whose flow is to be measured, a single resistance element therein for imparting heat to said flowing fluid and means from which the resistance or temperature of said element may be determined.

15. In combination, a conduit through which a stream of fluid is directed, a heating element mounted in said conduit, means for supplying electrical energy to said heating element, an ammeter for measuring the current flowing through said heating element, and a voltmeter for measuring the potential drop across the same.

16. The method of determining the work performed by a radiating surface which consists in dissipating heat from a heating element to a body of which said surface is a boundary and determining the temperature of said heating element while dissipating heat at a known rate.

17. The combination with a heating element of means for directing a moving fluid body past the same to heat said fluid and means from which the difference in temperature between said fluid and said heating element may be measured whereby the rate of flow of fluid may be determined.

18. The improved method of measuring heat dissipation which consists in determining the resistance of an electrical heating element when dissipating heat to a desired medium and comparing said resistance with the resistance of said element when dissipating heat to a standard medium.

19. The method of determining the heat conductivity of a given medium which consists in imparting heat thereto by means of a heating element and determining the temperature of said element when surrounded by said medium and dissipating heat thereto and referring said temperature to the temperature of said element when imparting heat to a standard medium.

20. The herein described process of measuring the flow of fluids which consists in dissipating heat at a predetermined rate to a flowing stream of the fluid by means of an electric heater and determining the difference in resistance of said heater when imparting heat to the flowing stream of fluid and when imparting heat to a stationary body of the fluid.

21. The herein described process of measuring the rate of flow of fluids which consists in imparting heat to the flowing stream of gas at a predetermined rate by means of an electric heater and determining the effect of the heat dissipation on said heater.

22. The method of measuring the flow of fluids which consists in passing a stream of fluid into heat exchanging relation to a body or medium having a different temperature than the fluid, maintaining the rate of heat energy supply to the body or medium constant and determining the effect on the body or medium of the heat transfer.

23. The method of measuring the flow of fluids which consists in determining the cooling effect of a stream of the fluid on a heater to which heat energy is supplied at a constant rate.

24. The method of measuring the flow of fluids which consists in determining the cooling effect of a stream of the fluid on an electric heater to which electric energy is supplied at a constant rate.

25. The method of measuring the flow of fluids which consists in passing a stream of the fluid into heat exchanging relation to a body or medium having a different temperature than the fluid, maintaining the difference in temperature constant, and measuring the variations in the rate of heat exchange.

26. The method of measuring the flow of fluids which consists in determining the amount of heat energy required to maintain a body or medium upon which the fluid exerts a cooling action as it flows at a temperature which exceeds that of the fluid by a constant amount.

27. The method of measuring the flow of fluids which consists in determining the rate at which heat energy is supplied to maintain a body or medium upon which the fluid exerts a cooling action as it flows at a temperature which exceeds that of the fluid by a constant amount.

28. The method of measuring the flow of fluids which consists in determining the amount of electric energy required to maintain an electrical resistance upon which the flowing stream of fluid exerts a cooling action as it flows at a temperature which exceeds that of the fluid by a constant amount.

29. The method of measuring the flow of fluids which consists in passing a stream of fluid into heating proximity to an electric heater, supplying electric energy to said heater at a rate to maintain it at a temperature which exceeds that of the fluid by a constant amount and measuring the rate at which energy is so supplied.

30. The method of measuring the flow of fluids which consists in passing a stream of the fluid into heating proximity to a heater, supplying heat energy to said heater to maintain it at a temperature which exceeds that of the fluid being measured by a constant amount and measuring the rate at which heat energy is supplied to maintain said constant excess of temperature.

In witness whereof, I have hereunto subscribed my name in the presence of two witnesses.

WILLIAM S. HADAWAY, Jr.

Witnesses:
W. L. CULLY,
W. W. MILLER.